HIGH-FREQUENCY TRANSMITTER AND RECEIVER

Original Filed June 26, 1950 3 Sheets-Sheet 1

Inventor
Irving A. Gross
By J. D. Douglas
Attorney

Dec. 28, 1954 I. A. GROSS 2,698,380
HIGH-FREQUENCY TRANSMITTER AND RECEIVER
Original Filed June 26, 1950 3 Sheets-Sheet 2
FIG. 2
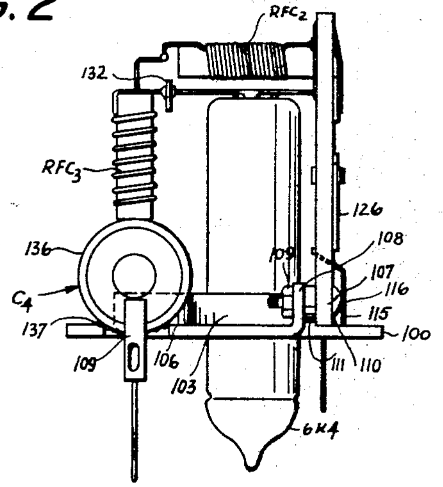
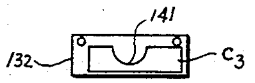
FIG. 3-a
FIG. 3
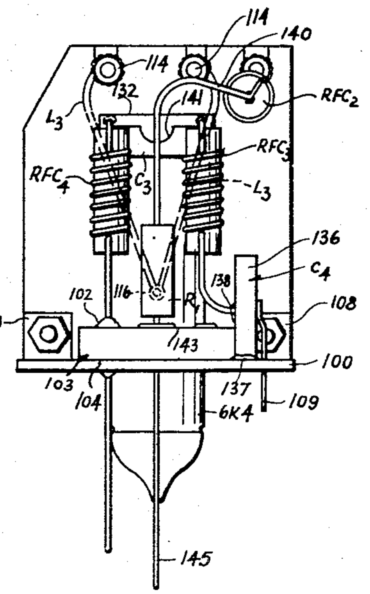
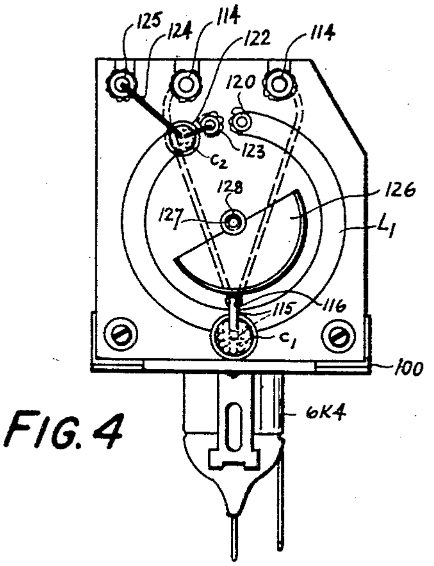
FIG. 4
Inventor
Irving A. Gross
By
J. W. Douglas
Attorney Dec. 28, 1954 I. A. GROSS 2,698,380

HIGH-FREQUENCY TRANSMITTER AND RECEIVER

Original Filed June 26, 1950 3 Sheets-Sheet 3

Inventor

Irving A. Gross

By

J. W. Douglas

Attorney

United States Patent Office 2,698,380

Patented Dec. 28, 1954

2,698,380

HIGH-FREQUENCY TRANSMITTER AND RECEIVER

Irving A. Gross, Cleveland, Ohio, assignor to Stewart-Warner Corporation, Chicago, Ill.

Original application June 26, 1950, Serial No. 170,409. Divided and this application May 6, 1952, Serial No. 286,281

1 Claim. (Cl. 250—13)

This invention relates to improvements in radio circuits and more particularly to a circuit and the arrangements of the components used in a circuit for high frequency transmission and reception, and is a division of my copending application, Ser. No. 170,409, filed June 26, 1950.

With the allocation of a band in the radio frequency spectrum for civilian use (460–470 mc.), it becomes desirable to provide apparatus for such use. Inasmuch as such apparatus contemplates a highly portable hand held transmitter and receiver, hereinafter called a "transceiver," it is desirable to have an apparatus that is light in weight, small in size, and yet one that must be extremely rugged in construction in order to withstand the shocks and abuse to which it is put by civilian or military use.

It is also desirable that such apparatus be extremely stable in operation since the operation must be maintained within the allocated band, 460 to 470 megacycles. To those versed in the art, it will be apparent that, normally, stability may be obtained by using a crystal controlled oscillator circuit which controls the carrier frequency. This type of equipment requires a larger number of tubes and more apparatus than is desirable because the crystal for commercial reasons must be cut to a lower frequency and the ultimate frequency obtained by a suitable number of multiplier stages. On the other hand, the well known modulated oscillator is indicated because of the extreme simplification of equipment but, as is also well known, such equipment had the inherent defect that it was not as stable as could be desired.

When I speak of stability, I mean the ability to tune the transmitter to a desired frequency and maintain that frequency throughout a transmission, as well as the ability to return to the same frequency for subsequent transmissions thus assuring reliability of contacts at different times.

By my present invention, I have provided what I believe to be an improvement in a circuit for transmission and receiving wherein the circuit itself is so conceived as to provide a greater stability. Also by the selection of certain improvements in the design of the circuit components per se, I am able to greatly increase the stability as well as to reduce the size and increase the ruggedness of the apparatus.

In the drawings:

Fig. 2 is a side view of the oscillator unit per se and its mounting;

Fig. 3 is a view taken from the left of Fig. 2;

Fig. 3*a* is a fragmentary view of certain parts of Fig. 3 that would otherwise be hidden;

Fig. 4 is a view taken from the right of Fig. 2; and

Figure 5:
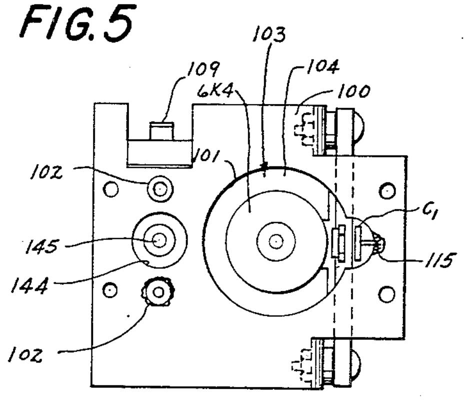
Figure 6:
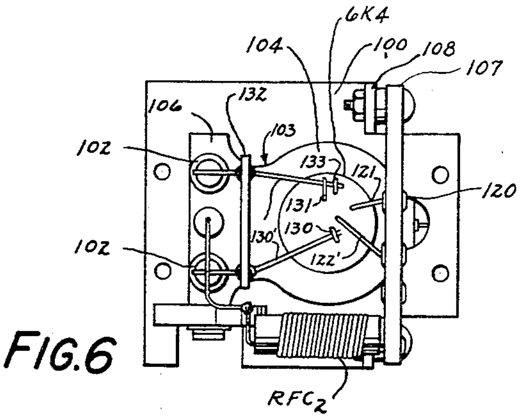

Figs. 5 and 6 are views from opposite ends of Fig. 2.

Briefly, my invention comprises a modulated oscillator circuit wherein the circuit itself has greater inherent stability and also increased power output, and wherein the components of the circuit including the oscillator tube and the oscillator and tank coils are so arranged and supported that the stability of the circuit is nearly that of a crystal controlled circuit. Means is provided to change the circuit by a simple switching arrangement, to add a quench oscillator and for converting the transmitting section to a super-regenerative detector section.

Figure 1:
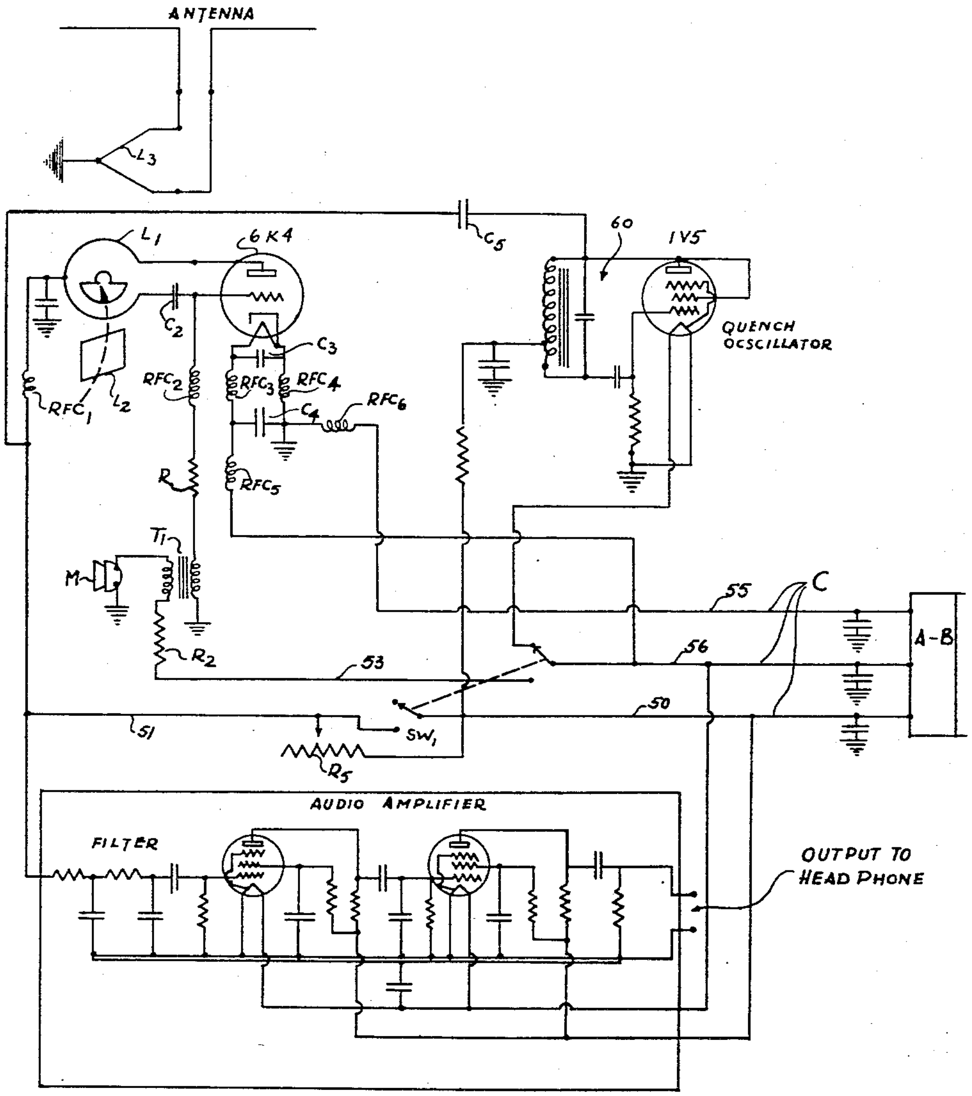
Fig. 1 is a schematic diagram of a combination transmitter and receiver circuit embodying my invention.

Referring to the drawings, throughout which like parts are designated by like reference characters, and particularly to Fig. 1, it will be seen that the circuit includes the self excited oscillator section, for transmission, including a microphone and a modulation transformer. The oscillator is also used as a super-regenerative receiver section for receiving, and an audio section is used in conjuction with the receiver.

Preferably, the power supply is provided by a separate battery supply A and B through a cable C.

The antenna circuit may comprise a dipole "antenna" connected by a transmission line to the antenna coil $L_3$. The center of the coil is grounded as shown.

The high frequency oscillator circuit is coupled to the antenna circuit, the exact manner of coupling will be later more fully described, and includes the tank inductance $L_1$, one end of which is connected to the anode of the triode tube 6K4, and the other end of which is capacitively coupled through the condenser $C_2$ to the grid of the tube.

Anode supply voltage is provided through the line 50, switch $SW_1$, and line 51, through the choke coil R. F. C. 1 to the center of the tank inductance. The grid circuit of the oscillator is connected through the choke R. F. C. 2 and resistor R through the secondary of the modulation transformer $T_1$ to ground. The grid circuit is modulated by changing the direct current grid bias by the transformer $T_1$. The primary of the transformer $T_1$ has the microphone M connected to one side, the other terminal of M being grounded. The second terminal of the primary receives approximately 6 volts from the power supply by way of line 53 through the resistor $R_2$.

It will be appreciated that the tank circuit $L_1$, coupled to the tube 6K4 with the capacity $C_2$ connecting the tank circuit into the grid, constitutes a self excited oscillator, the magnitude of the oscillations depending upon the bias on the grid. If, therefore, the grid bias is varied by the circuit shown, at an audio frequency rate, the output from the oscillator will be modulated.

Normally, such a circuit has relatively low wattage output and is of questionable stability. However, by the improved circuit components and arrangements of parts, I am able to improve the stability to the extent that it is comparable to that of a crystal controlled oscillator.

An important feature of the invention, wherein greater power is realized, resides in the arrangement of the cathode circuit. As can be seen by the diagram, the cathode is indirectly heated by a filament from the 6 volt power supply through the lines 55 and 56, which are connected to the filament, first through chokes R. F. C. 5 and R. F. C. 6 for each line, and next through chokes R. F. C. 3 and R. F. C. 4. The chokes R. F. C. 3 and R. F. C. 4 have a condenser $C_3$ across the filament end and another condenser $C_4$ across the power supply end, the juncture of R. F. C. 4 and R. F. C. 6 being grounded.

By this arrangement I am able, by a proper selection of circuit values, to greatly decrease the power losses in the filament and/or cathode circuit and provide a great increase in power output.

I believe that the improved efficiency of my circuit to be due to the fact that the grounded cathode lead is of such a capacity that together with the cathode circuit within the tube, it constitutes a series resonant bypass at the operating frequency.

The filament circuit exterior of the tube is tuned to be resonant at a frequency higher than the operating frequency and performs a phase shifting function that improves the power output. I appreciate that it may be difficult, if not impractical, to prove the exact manner of the operation of this portion of the circuit. Tests have shown, however, that with the circuit arranged as shown, a material increase in power output is achieved. Should it later be discovered that the increase in power is due to some other theory of operation than that described, I do not desire to be limited thereby.

In normal operation, the tank circuit for the oscillator tube is designed to operate at a particular frequency within the desired range, and it is contemplated that having once been set to operate at this frequency that it will not be changed. Provision is made, however, to adjust this frequency within the limits of the band, it being contemplated that complete units will be provided in groups of two or more which, because it is desirable that the frequency be known, will all be adjusted to the same frequency being that desired by the user.

The receiver portion of the unit includes the tube 1V5 which is a low frequency quench oscillator arranged to supply the necessary quench voltage to the plate circuit of the high frequency oscillator; at this time the switch $SW_1$ is opened, as shown in the diagram Fig. 1, to provide a variable resistance $R_5$ which enables the plate voltage of the 6K4 tube to be lowered. (In the transmit position, full supply voltage of 135 volts is applied to the anode of the 6K4).

In this position, the signal is received in the tank circuit $L_1$, and the quench voltage which may be 135 kc. from the quench oscillator 60, is supplied through the coupling condenser $C_5$ to the high frequency oscillator circuit through the choke R. F. C. 1, the choke R. F. C. 1 being ineffective to block voltages at that frequency.

The output from this circuit is then supplied to the audio amplifier which has the proper R. C. network in the input to filter out the high quench frequencies and pass the lower frequencies after which it may be supplied to a head phone.

A feature of the "receiver" part of the circuit includes the closed inductance $L_2$ which may be rotated into inductive relation with the tank coil $L_1$, to enable the circuit, when being used as a receiver, to be tuned, and to allow the coil $L_2$ to be removed from proximity to the coil $L_1$ in the "transmit" circuit when transmitting so that a proper return to the exact transmit circuit is always realized. The exact details of this construction forms the basis of my separate application, Ser. No. 164,737 filed May 27, 1950.

As I previously stated, the mechanical design of my circuit components has a decided effect on its electrical operation particularly from the desirable standpoint of stability. Figs. 2 to 6 inclusive show the high frequency oscillator and its various components. The figures of the drawings show the mounting plates with the tube being supported in a base up position. It will be appreciated, however, that the entire unit may be placed in any position in a circuit.

The unit includes a silver plated metal base plate 100 having a generally circular opening 101. Secured to the top of the plate by eyelets 102 is a member of insulating material such as formica or other desirable dielectric 103 which has a body portion 104 substantially surrounding and having a close supporting fit with tube 6K4. The form sets over the opening 101 and holds the tube centered in the opening. The lower end and seal off of the tube extends downward below the base plates.

The end 106 of the member 103 remote from the tube, and through which the eyelets pass, is of generally T formation.

The antenna and tank inductances are supported in a vertical position alongside and parallel to the tube on a ceramic plate that has substantially no change in expansion over wide climatic and physical variations, of which one type is available on the market known as "Steatite."

The base plate 100 is provided with a pair of lugs 108 which are struck from the corners of the plate at one end and bent to extend upward in a vertical position. The "Steatite" plate 107 is secured to these lugs by suitable nuts, bolts and washers 109, 110 and 111 to hold the plate in a rigid upright position.

The antenna inductance and the tank inductance are formed by printing conductive layers of metal, which may be silver, on the surface of the plate. As can best be seen in Fig. 3, the antenna inductance $L_3$ is provided in the form of a V, the upper ends of the legs start at eyelets 114 which may be tinned, both to provide a good connection to the inductance and also to provide means for facilitating subsequent connection to the transmission line. The apex or point of the V extends downward to a point spaced from the bottom of the plate and a lead 115, connected to the apex, extends through an opening 116 in the plate across and is soldered to one side of the capacitor $C_1$. It then extends through a cutout in the base, is bent over and soldered to the under side of the base as can best be seen in Fig. 5.

The oscillator tank inductance $L_1$, Fig. 4, may take a circular form, or that of a supine C, the open ends being at the top and the closed part of the loop extending toward the bottom of the plate on the opposite side of the plate from the antenna coil.

The upper open ends are at the top of the plate and one end is soldered directly to an eyelet 120 and which connects by a wire 121 to the anode lead coming out of the base of the tube. The other end has a capacitor $C_2$, one plate of which is soldered to the end of the inductance and the other plate of which is connected by a lead 122 through the eyelet 123 and thence to the grid lead 122' of the tube. Also connected to the outside plate of the capacitor $C_2$ is a lead 124 which extends to an eyelet 125 on the corner of the plate and through the eyelet, being securely soldered, connects to one end of the choke coil R. F. C. 2. Capacitors $C_1$ and $C_2$ are of the miniature button disc type.

As can best be seen in Fig. 4, a semi-circular plate 126 is provided being secured at its center by an eyelet 127 and spring washers 128 to the plate 107 at the axis of the tank coil $L_1$. The plate is thus movably mounted but it requires considerable effort to move it so that when it is once placed in the desired position, it will stay in that position. The plate provides a means whereby the inductance of the tank coil $L_1$ may be varied and hence the transmission frequency, within the limits of the frequency range allocated, be determined.

At this point, it will be noted that the relation of the antenna and oscillator tank inductances is definitely fixed. They cannot vibrate relative to each other. Furthermore, the important grid and anode leads, as well as the grid coupling condenser $C_2$ all have extremely short and stiff leads securely anchored to the base and preventing vibrations and resultant changes in capacitance therebetween.

It will also be noted that, because the antenna inductance is separated from the tank coil only by the ceramic plate, there would be some tendency for capacitive coupling therebetween which might be undesirable, particularly if it were of a high order. Therefore, by making the one inductance of V shape and the other circular, this capacity is minimized without seriously affecting the inductive relation. This also enables the tank coil to be tuned independently of the antenna coil by the plate 126 without upsetting the impedance matches in the antenna circuit, because the movement of the plate has but little effect on the V coil and does not materially change the inductance of the tank coil.

The heater leads 130 and 131, Fig. 6, are soldered to relative stiff buss wires 130' and 131' respectively which extend away from the plate 107 and are held in fixed spaced relation to each other by a small ceramic plate 132 of rectangular formation, through which the leads extend. A small drop of solder is placed on the leads on opposite sides of the plate to hold the assembly in predetermined relation.

The side of the plate 132 away from the tube is coated with conducting material, as can best be seen in Fig. 3*a*, one end of which connects to the lead 130' and the other end of which extends in spaced relation to the lead 131' behind the chokes. This constitutes the capacitor $C_3$.

The two chokes R. F. C. 3 and R. F. C. 4 extend downward in spaced parallel relation toward the base of the tube. All of the chokes thus far mentioned in connection with this unit are wound on suitable forms which may be ceramic. The cathode lead 133 of the tube also connects to the lead 131', and the choke R. F. C. 4 is grounded, being soldered to the eyelet 102 in the base 106 as well as to the underside of the base plate 100.

The other choke R. F. C. 3 is connected at 138 to one side of the condenser $C_4$, the outer plate 136 of which is grounded by soldering to the base plate 100 as indicated at 137. The other side of the plate 108 is provided with a solder lug 109 for connection to the choke R. F. C. 5. The other end of the choke R. F. C. 2 which is connected to the grid lead is provided with a lead 140 which is trained, as can best be seen in Fig. 3, opposite the center of the plate 132 which has the condenser $C_3$ thereon, the capacity of the condenser at that point being reduced by narrowing the band of conductive material as indicated at 141. The lead then extends downward midway and parallel between the chokes R. F. C. 3 and R. F. C. 4 and is connected to the resistor $R_1$. The other end of the lead from the resistor is soldered in an eyelet 143, the plate 100 being provided with an opening 144 opposite the eyelet so that the end 145 of the lead may pass the plate 100 without shorting thereto.

Although certain specific voltages have been mentioned as being desirable for an efficient operating circuit, it will be appreciated that the range of these voltages may vary within wide circuits, and it will also be appreciated that, although certain types of tubes are desirable, it is within the purview of my invention to utilize other tube types.

It can be seen particularly from Figs. 2 to 6 inclusive, that several things lend high stability to the operation of the device. Among these are the fixed relation in which the tank and antenna coils are held to prevent not only vibrations or changes in the individual coils themselves, but in the coupling between the coils.

Due to the placement of the tube, it is possible to provide very short grid and anode leads to the tank coil, and since these leads extend through the plate they are more accurately held in position. Further, by placing the tank coil on the side of the plate away from the tube, it is easier to adjust the inductance because the plate 126 is more accessible.

The filament chokes R. F. C. 3—4 are also symmetrically disposed relative to the tube and secondly held in spaced relation to each other, as well as to the other parts, which enables the resonant frequency of this part of the circuit to be maintained. The condenser $C_3$ which forms a part of the resonant combination, being a metallic coating on the choke support 132, maintains a definite capacity between the parts, while the section of reduced area 1 at 141 reduces the capacitive coupling to the grid resistor lead 140.

A brief summary of the operation of the device is as follows:

In the "transmit" position, the switch $SW_1$ is closed and $SW_2$ is shifted to the "T" position. Closing switch $SW_1$ provides full power supply to the tube 6K4 and $SW_2$ opens the filament circuit to the quench oscillator and applies voltage to the microphone M. At the same time the switches are moved, the tuning inductance $L_2$ is moved out of inductive relation to the tank coil $L_1$ so that in this position the oscillator is now operating on the frequency for which it was set by the plate 126. Preferably, this is all effected by one control and is such a control that force must be used to maintain the parts in that position. This is commonly known as "push to talk."

As soon as the message is transmitted, the control is released and the switches are spring biased to return to the position shown. At the same time, the tuning inductance $L_2$ is rotated back into inductive relation with the tank coil, at which point it may be adjustably moved by a separate control to tune the tank circuit. In the "receive" position, the microphone is out of the circuit and the variable resistance $R_5$ is in the circuit, this resistance constituting a volume control.

Having thus described my invention, I am aware that numerous and extensive departures may be made therefor without departing from the spirit or scope thereof.

I claim:

A circuit for the transmission and reception of radio signals including an antenna circuit including a quarter wave dipole antenna and a transmission line connected to the grounded center of an antenna inductance; a high radio frequency oscillator circuit inductively coupled to said antenna circuit including a tank circuit, the center point of which is grounded for radio frequency and tuning means for varying the inductance of the tank circuit, a tube having an anode directly connected to said tank inductance, a grid capacitively coupled to tank inductance, and a cathode heater supply circuit which comprises a tuned circuit resonant at a frequency higher than the oscillator frequency; a grid bias circuit for said tube including a radio frequency choke, and a modulation transformer secondary serially connecting said grid to ground and means connected to the primary of the transformer to change the reactance in the secondary for supplying a modulation component to said grid; a source of anode supply voltage for connection to said anode through said tank inductance and switch means in said anode voltage supply source and variable resistance means arranged to be inserted in said supply line for variably controlling the anode voltage, a second oscillator of low frequency beyond the audible range comprising a quench frequency oscillator, and switch means arranged to activate and deactivate said oscillator and means for coupling said quench oscillator to said tank circuit.

References Cited in the file of this patent

UNITED STATES PATENTS

| Number | Name | Date |
|---|---|---|
| 2,261,879 | Higgins | Nov. 4, 1941 |
| 2,342,896 | Salzberg | Feb. 29, 1944 |
| 2,416,794 | Crosby | Mar. 4, 1947 |
| 2,505,022 | Wheeler | Apr. 25, 1950 |
| 2,561,421 | Seale et al. | July 24, 1951 |